(12) United States Patent
Uekusa et al.

(10) Patent No.: US 9,894,339 B2
(45) Date of Patent: Feb. 13, 2018

(54) IMAGE PROCESSING APPARATUS, IMAGE PROCESSING METHOD AND PROGRAM

(71) Applicant: CANON KABUSHIKI KAISHA, Tokyo (JP)

(72) Inventors: Tomotaka Uekusa, Yokohama (JP); Yasushi Ohwa, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/005,192

(22) Filed: Jan. 25, 2016

(65) Prior Publication Data

US 2016/0227182 A1 Aug. 4, 2016

(30) Foreign Application Priority Data

Feb. 2, 2015 (JP) .................................. 2015-018688

(51) Int. Cl.
*H04N 9/73* (2006.01)
*H04N 5/232* (2006.01)
*H04N 5/235* (2006.01)
*H04N 9/04* (2006.01)

(52) U.S. Cl.
CPC ............. *H04N 9/735* (2013.01); *H04N 5/232* (2013.01); *H04N 5/2354* (2013.01); *H04N 5/23219* (2013.01); *H04N 9/045* (2013.01)

(58) Field of Classification Search
CPC .................................. H04N 9/73; H04N 9/735
USPC .................................. 348/224.1, 227.1, 223.1
See application file for complete search history.

(56) References Cited

U.S. PATENT DOCUMENTS

| 8,614,751 | B2* | 12/2013 | Ogawa | ............... | H04N 5/23229 348/222.1 |
| 2007/0024742 | A1* | 2/2007 | Raskar | ................. | H04N 5/2355 348/370 |
| 2009/0040335 | A1* | 2/2009 | Ito | .......................... | H04N 9/735 348/223.1 |
| 2010/0007765 | A1* | 1/2010 | Myhrvold | .............. | H04N 9/735 348/223.1 |

(Continued)

FOREIGN PATENT DOCUMENTS

| EP | 2 426 927 A2 * | 9/2011 | ............... H04N 9/73 |
| JP | 3540485 B2 | 7/2004 | |
| WO | WO 2004/010711 A1 * | 1/2004 | ............... H04N 9/04 |

*Primary Examiner* — Anthony J Daniels
(74) *Attorney, Agent, or Firm* — Carter, DeLuca, Farrell & Schmidt, LLP

(57) ABSTRACT

The present invention has an object to enable white balance correction appropriate to an image photographed with strobe light-emitting. An image processing apparatus includes: a first correcting unit that corrects image data photographed with strobe light-emitting using a first WEB correction value corresponding to environmental light, and generates a first WEB correction image; a second correcting unit that corrects the image data photographed with strobe light-emitting using a second WEB correction value corresponding to strobe light, and generates a second WEB correction image; a combining ratio calculating unit that obtains a combining ratio of the first and second WEB correction images based on information on a distance to an object photographed with strobe light-emitting and distribution characteristics of the strobe light; and a combining unit that combines the first and second WEB correction images based on the combining ratio.

7 Claims, 11 Drawing Sheets

(56) References Cited

U.S. PATENT DOCUMENTS

| | | | | |
|---|---|---|---|---|
| 2011/0109767 A1* | 5/2011 | Matsunaga | ............ | H04N 5/232 348/223.1 |
| 2012/0057045 A1* | 3/2012 | Shimizu | ................ | H04N 9/735 348/223.1 |
| 2012/0113295 A1* | 5/2012 | Kitagawa | ............ | H04N 5/2351 348/224.1 |
| 2013/0057727 A1* | 3/2013 | Ouchi | ................... | H04N 9/735 348/224.1 |
| 2014/0036106 A1* | 2/2014 | Ouchi | ................... | H04N 9/735 348/224.1 |
| 2014/0168466 A1* | 6/2014 | Yoshida | ................ | H04N 9/735 348/224.1 |
| 2014/0176759 A1* | 6/2014 | Goto | ................... | H04N 5/2354 348/224.1 |
| 2014/0267827 A1* | 9/2014 | Husoy | ................... | H04N 9/735 348/223.1 |
| 2015/0009383 A1* | 1/2015 | Fujii | ..................... | H04N 5/347 348/302 |
| 2015/0116536 A1* | 4/2015 | Shimizu | ................ | H04N 9/735 348/224.1 |
| 2015/0281553 A1* | 10/2015 | Ogura | ..................... | G02B 7/09 348/348 |
| 2016/0191881 A1* | 6/2016 | Sako | ...................... | H04N 9/735 348/224.1 |
| 2017/0013242 A1* | 1/2017 | Fujiwara | ............... | H04N 9/735 |
| 2017/0013243 A1* | 1/2017 | Fujiwara | ............... | H04N 9/735 |

* cited by examiner

IMAGE PROCESSING APPARATUS, IMAGE PROCESSING METHOD AND PROGRAM

BACKGROUND OF THE INVENTION

Field of the Invention

The present invention relates to an image processing apparatus, an image processing method and a program.

Description of the Related Art

In general, an imaging apparatus such as a digital camera has an automatic white balance controlling function of automatically adjusting the color tone of a photographed image. According to conventional automatic white balance control, a calculated white balance correction value is applied to an entire image. Hence, in the case of photographing in an environment in which plural light sources exist (for example, photographing with strobe light-emitting), it is difficult to obtain an image having coloring appropriate to each of the light sources.

To deal with this, for example, an electronic still camera described in Japanese Patent No. 3540485 compares an image at photographing with strobe light-emitting and an image at photographing without strobe light-emitting for each arbitrary object region to obtain the ratio of data, and determines the degree of contribution of strobe light based on the value of the obtained ratio. Then, according to the degree of contribution, the electronic still camera described in Japanese Patent No. 3540485 selects a white balance correction value for each region of image data obtained by emitting strobe light for light exposure, to thereby perform white balance control.

Unfortunately, in the case of the technique described in Japanese Patent No. 3540485, there is a time difference in acquisition timing between image data photographed with strobe light-emitting and image data photographed without strobe light-emitting. Hence, the electronic still camera described in Japanese Patent No. 3540485 has a problem that, for example, in the case where one of an object and a camera is moving, the radiation range and the radiation amount of strobe light are erroneously detected and a coloring discrepancy occurs in a boundary portion of a substance such as the object. Moreover, the electronic still camera described in Japanese Patent No. 3540485 performs development processing after varying a white balance correction value for each region. Hence, other controls such as color reproduction control may not be appropriate to the white balance correction value. As a result, appropriate coloring cannot be sufficiently reproduced.

SUMMARY OF THE INVENTION

The present invention, which has been made in view of the above-mentioned problem, has an object to provide an image processing apparatus, an image processing method and a program that enable white balance correction appropriate to an image photographed with strobe light-emitting.

According to an aspect of the present invention, an image processing apparatus comprises: a first correcting unit that corrects data on a strobe light-emission image photographed with strobe light-emitting, using a first white balance correction value corresponding to environmental light, and generates first white balance correction image data; a second correcting unit that corrects the data on the strobe light-emission image using a second white balance correction value corresponding to strobe light, and generates second white balance correction image data; an acquiring unit that acquires distance information indicating a distance from an imaging unit, of each object included in the strobe light-emission image; a calculating unit that calculates a ratio of a component of the strobe light for each region of the strobe light-emission image, based on distribution characteristics of the strobe light and the distance information; and a combining unit that combines the first white balance correction image data and the second white balance correction image data for each region using a combining ratio according to the component ratio.

According to the present invention, white balance correction appropriate to an image photographed with strobe light-emitting is enabled.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Hereinafter, exemplary embodiments of the present invention are described in detail with reference to the drawings. First, an image processing apparatus of the first embodiment is described with reference to FIG. 1 to FIG. 8C. The image processing apparatus of the first embodiment is an imaging apparatus 100 such as a digital camera capable of acquiring a distance map (to be described later) including information on a distance to an object.

Figure 1:
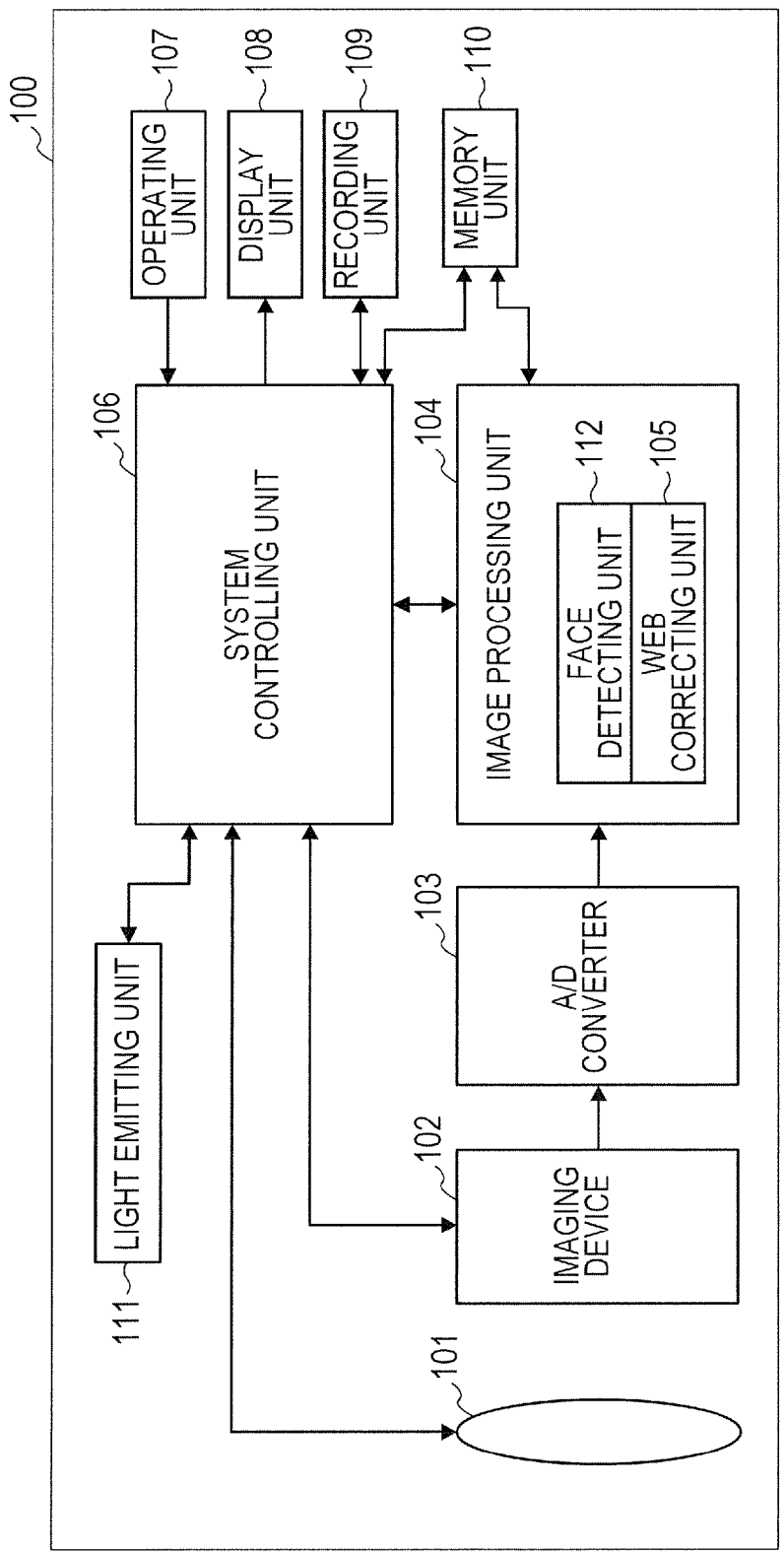
FIG. 1 is a diagram illustrating a schematic configuration of an imaging apparatus of an embodiment.

FIG. 1 is a diagram illustrating a schematic configuration of the imaging apparatus 100 of the present embodiment. In FIG. 1, the imaging apparatus 100 includes an imaging optical system 101, an imaging device 102, an A/D converter 103, an image processing unit 104, a system controlling unit 106, an operating unit 107, a display unit 108, a recording unit 109, a memory unit 110 and a light emitting unit 111.

The imaging optical system 101 includes a diaphragm and a group of lenses including a focus lens. The imaging optical system 101 receives light from the object, and guides the light to the imaging device 102. The focus lens included in the imaging optical system 101 is driven based on a drive command from a lens drive controlling unit (not illustrated), and enables adjustment of a point of focus. Note that the focus lens may be driven in response to a turning operation of a focus ring. A light flux that has passed through the imaging optical system 101 forms an optical image of the object on the imaging device 102.

The light emitting unit 111 includes: a strobe light emitting unit that emits so-called strobe light; and an auxiliary light source unit that continues in a lighting-up state to assist illumination at photographing. The strobe light emitting unit may be a strobe built in a camera, may be a so-called external strobe not attached to a camera, and may be an external strobe connected by a cable or wirelessly. Light emitting operations (such as emitting strobe light and not emitting strobe light) of the light emitting unit 111 are controlled by the system controlling unit 106.

The imaging device 102 is an imaging device including a CCD and a CMOS, has a surface covered by RGB color filters arranged in, for example, Bayer layout, and is capable of color photography. The imaging device 102 converts the received light flux into an electrical signal, and outputs the electrical signal as an analog signal to the A/D converter 103. The A/D converter 103 is a converter for converting the analog signal from the imaging device 102 into a digital signal. The A/D converter 103 outputs the converted digital signal to the image processing unit 104.

The operating unit 107 is an operating device including various switches, various dials, and a shutter button provided to the imaging apparatus 100. The operating unit 107 enables a photographer to input operation commands for photographing parameter settings and a photographing operation. An operation input signal that is given by the photographer through the operating unit 107 is output to the system controlling unit 106. Note that the shutter button includes a switch capable of being pressed halfway and pressed fully.

The display unit 108 includes a liquid crystal display (LCD), displays an image at photographing transferred from the system controlling unit 106 and an image stored in the recording unit 109, and displays various setting screens. A detachable recording medium such as a memory card compliant with various standards is attached to the recording unit 109. The recording unit 109 records image data transferred through the system controlling unit 106, into the recording medium, and reads the recorded data out of the recording medium.

The image processing unit 104 performs various image processing operations including white balance correction processing and face detection processing. The white balance correction processing by the image processing unit 104 may be achieved by a circuit configuration of a white balance correcting unit 105, and may be achieved by a group of programs executed by the system controlling unit 106. Hereinafter, in the present embodiment, the white balance is represented as "WEB" as appropriate. A detailed configuration of the WEB correcting unit 105 and a method of determining a white balance correction value are described later. Moreover, the face detection processing by the image processing unit 104 may be achieved by a circuit configuration of a face detecting unit 112 or the like, and may be achieved by a group of programs executed by the system controlling unit 106. The face detection processing is described later in a second embodiment. The image processing unit 104 performs image processing on a group of digital signals supplied from the A/D converter 103, based on a control command from the system controlling unit 106, and generates image data for recording and image data for display. The image processing performed by the image processing unit 104 includes: processing of applying color gain to image data after WEB correction to convert the image data into one of a color difference signal and a RGB signal; and development processing such as gamma correction processing. Note that, at the time of performing the image processing, the image processing unit 104 stores the image data into the memory unit 110 as appropriate, and reads out the image data as appropriate.

Moreover, the image processing unit 104 acquires data on a distance map holding information on a distance to the object, based on a signal imaged by the imaging device 102. Here, an acquiring method when the image processing unit 104 acquires the distance map data is described. In the imaging device 102, plural microlenses are arranged in a lattice-like pattern, and plural divided pixels are provided below each microlens. For example, in the case where two right and left divided pixels in the horizontal direction are provided below each microlens, first, the image processing unit 104 calculates a correlation value of a value of the left divided pixel and a value of the right divided pixel that are provided within the same line in the horizontal direction. Then, based on a parallax between divided pixels having the highest correlation value and information on a pixel pitch of the imaging device 102, the image processing unit 104 calculates a distance in the real space, that is, a distance in the depth direction in the real space from the imaging device 102 to the object. The image processing unit 104 repetitively performs such processing as described above for each arbitrary region, to thereby generate a distance map including distance information of each arbitrary region. In the present embodiment, the arbitrary region used for acquiring the distance map is defined, as an example, as a region of each block obtained by dividing an image as described later. Accordingly, in this case, the resolution of the distance map is equal to the resolution of each block obtained by dividing the image.

The system controlling unit 106 includes a CPU, and performs operation control of the entire system such as drive control of the focus lens in the imaging optical system 101, according to a control program stored in the memory unit 110. The system controlling unit 106 also performs signal input/output among components, for example, acquires data obtained by the image processing by the image processing unit 104 and lens position information of the imaging optical system 101.

The memory unit 110 includes a ROM and a RAM. The ROM of the memory unit 110 stores: basic software that is a system program; programs for the system controlling unit 106 and the image processing unit 104 to execute various controls and various signal processing operations to be described later; and various pieces of data used during the execution of the programs. The programs executed by the system controlling unit 106 and the image processing unit 104 are developed in the RAM of the memory unit 110, and the RAM of the memory unit 110 serves as a data area used by the programs. In the present embodiment, examples of various pieces of data stored in the ROM of the memory unit 110 include: data on distribution characteristics of strobe light; data on an average standard reflectance of a general substance; data on a reflectance of a human face; and data on a three-dimensional model of a face, although the details thereof are described later. Examples of pieces of data temporarily stored in the RAM of the memory unit 110 include: photographed image data; image data at photographing without strobe light-emitting; image data at photographing with strobe light-emitting; and data on a distance map at photographing with strobe light-emitting, although the details thereof are described later.

Figure 2:
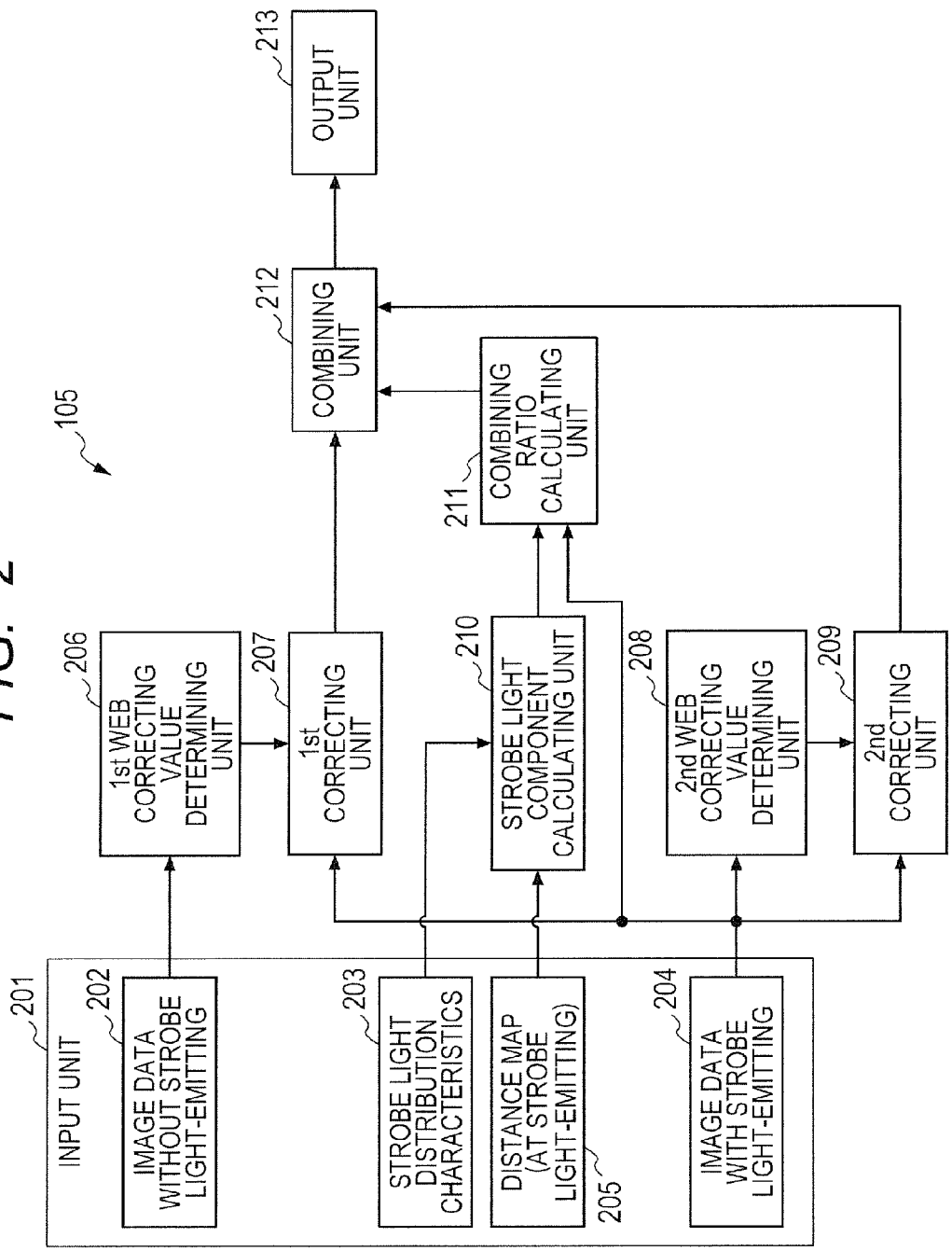
FIG. 2 is a diagram illustrating a configuration of a WEB correcting unit of the embodiment.

Hereinabove, the schematic configuration of the imaging apparatus 100 of the present embodiment has been described. Next, the configuration of the WEB correcting unit 105 of the image processing unit 104 and the method of determining a white balance correction value are described in detail. FIG. 2 is a diagram illustrating the configuration of the WEB correcting unit 105. In FIG. 2, the WEB correcting unit 105 includes an input unit 201, a first WEB correction value determining unit 206, a first correcting unit 207, a second WEB correction value determining unit 208, a second correcting unit 209, a strobe light component calculating unit 210, a combining ratio calculating unit 211, a combining unit 212 and an output unit 213.

The input unit 201 reads image data 202 at photographing without strobe light-emitting, data on distribution characteristics 203 of strobe light, data on a distance map 204 at photographing with strobe light-emitting and image data 205 at photographing with strobe light-emitting out of the memory unit 110, and outputs these pieces of data to each unit. The details of how these pieces of data are acquired and used are described later.

Figure 3:
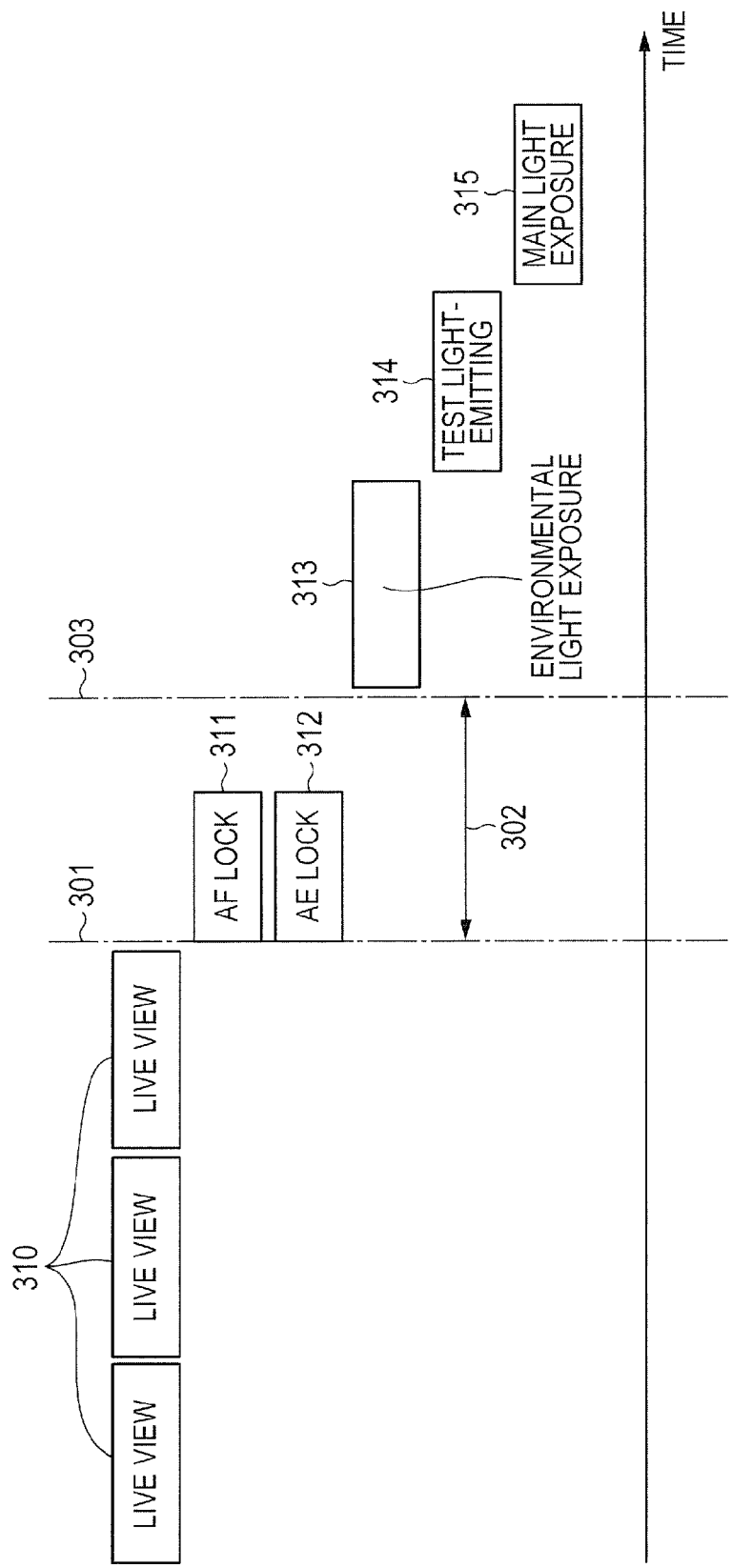
FIG. 3 is a diagram illustrating a state where photographing controls by the imaging apparatus are arranged in chronological order.

FIG. 3 is a diagram illustrating a state where photographing controls by the system controlling unit 106 are arranged in chronological order. In FIG. 3, before a state 301 (hereinafter, represented as SW1) where the shutter button is pressed halfway, the system controlling unit 106 controls the imaging optical system 101 and the imaging device 102 to photograph an image 310 for so-called live view display for each frame cycle. In the state of SW1 where the shutter button is pressed halfway, the system controlling unit 106 controls the imaging optical system 101 to perform an AF lock 311 and an AE lock 312. Note that the AF lock 311 is control for locking a focal distance in autofocus control for driving the focus lens in the imaging optical system 101. The AE lock 312 is control for locking an exposure value in automatic exposure control. After a holding period 302 during which the state of SW1 is held, when a state 303 (hereinafter, represented as SW2) where the shutter button is pressed fully comes, the system controlling unit 106 controls the light emitting unit 111 to perform test light-emitting 314. After that, the system controlling unit 106 controls the imaging optical system 101, the imaging device 102 and the light emitting unit 111 to perform main light exposure 315 for actually photographing an image of the object.

Here, before the test light-emitting 314 is performed, the system controlling unit 106 controls the imaging optical system 101 and the imaging device 102 to perform light exposure also in a period that is illustrated as environmental light exposure 313 in FIG. 3. In the present embodiment, image data that is exposed to light in the period of the environmental light exposure 313 corresponds to the image data 202 at photographing without strobe light-emitting in FIG. 2, and image data that is exposed to light in the period of the main light exposure 315 corresponds to the image data 205 at photographing with strobe light-emitting in FIG. 2. The image data 202 at photographing without strobe light-emitting is image data acquired by imaging by the imaging device 102 using environmental light without strobe light-emitting by the light emitting unit 111. The image data 205 at photographing with strobe light-emitting is image data acquired by imaging by the imaging device 102 with strobe light-emitting by the light emitting unit 111. Note that the image data 202 at photographing without strobe light-emitting may be photographed image data that is exposed to the environmental light after the main light exposure 315.

Returning to the description of FIG. 2, the first WEB correction value determining unit 206 determines a WEB correction value corresponding to the environmental light based on the image data 202 at photographing without strobe light-emitting, and outputs data on the WEB correction value to the first correcting unit 207. The second WEB correction value determining unit 208 determines a WEB correction value corresponding to the strobe light based on the image data 205 at photographing with strobe light-emitting, and outputs data on the WEB correction value to the second correcting unit 209.

The first correcting unit 207 performs WEB correction on the image data 205 at photographing with strobe light-emitting, based on the WEB correction value corresponding to the environmental light. The second correcting unit 209 performs WEB correction on the image data 205 at photographing with strobe light-emitting, based on the WEB correction value corresponding to the strobe light. The image data after the WEB correction by the first correcting unit 207 and the image data after the WEB correction by the second correcting unit 209 are output to the combining unit 212.

The strobe light component calculating unit 210 calculates a strobe light component for each region (to be described later) of the image data 205 at photographing with strobe light-emitting, from the data on the distribution characteristics 203 of the strobe light and the data on the distance map 204 acquired with strobe light-emitting, and outputs the strobe light component to the combining ratio calculating unit 211. The detail of the distribution characteristics 203 of the strobe light is described later.

The combining ratio calculating unit 211 calculates a combining ratio for image combining, based on the image data 205 at photographing with strobe light-emitting and the strobe light component, and outputs the combining ratio to the combining unit 212. The combining unit 212 combines the image data after the WEB correction by the first correcting unit 207 and the image data after the WEB correction by the second correcting unit 209, based on the combining ratio output by the combining ratio calculating unit 211. The image data combined by the combining unit 212 is sent as final white balance correction image data to the output unit 213. The output unit 213 outputs the white balance correction image data to a processing unit in the subsequent stage.

Figure 4:
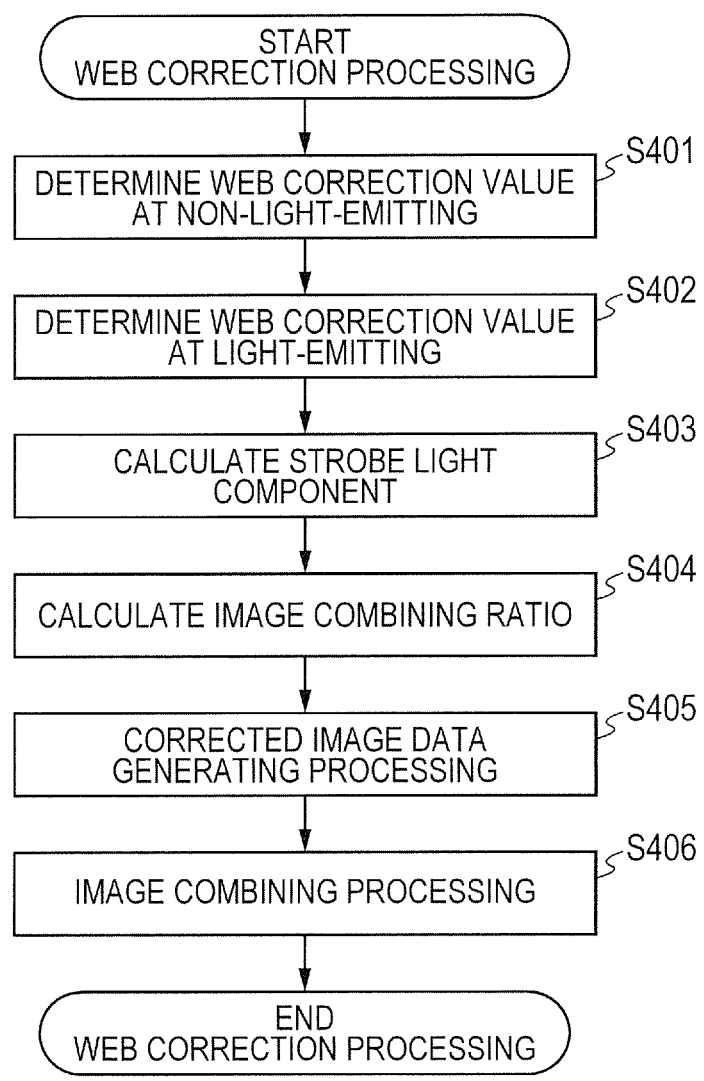
FIG. 4 is a flowchart of white balance correction processing.

Hereinabove, the configuration of the WEB correcting unit 105 inside of the imaging apparatus 100 of the first embodiment has been described. Next, a WEB correcting operation by the WEB correcting unit 105 of the present embodiment is described. FIG. 4 is a flowchart of correction processing performed by the WEB correcting unit 105.

Figure 5:
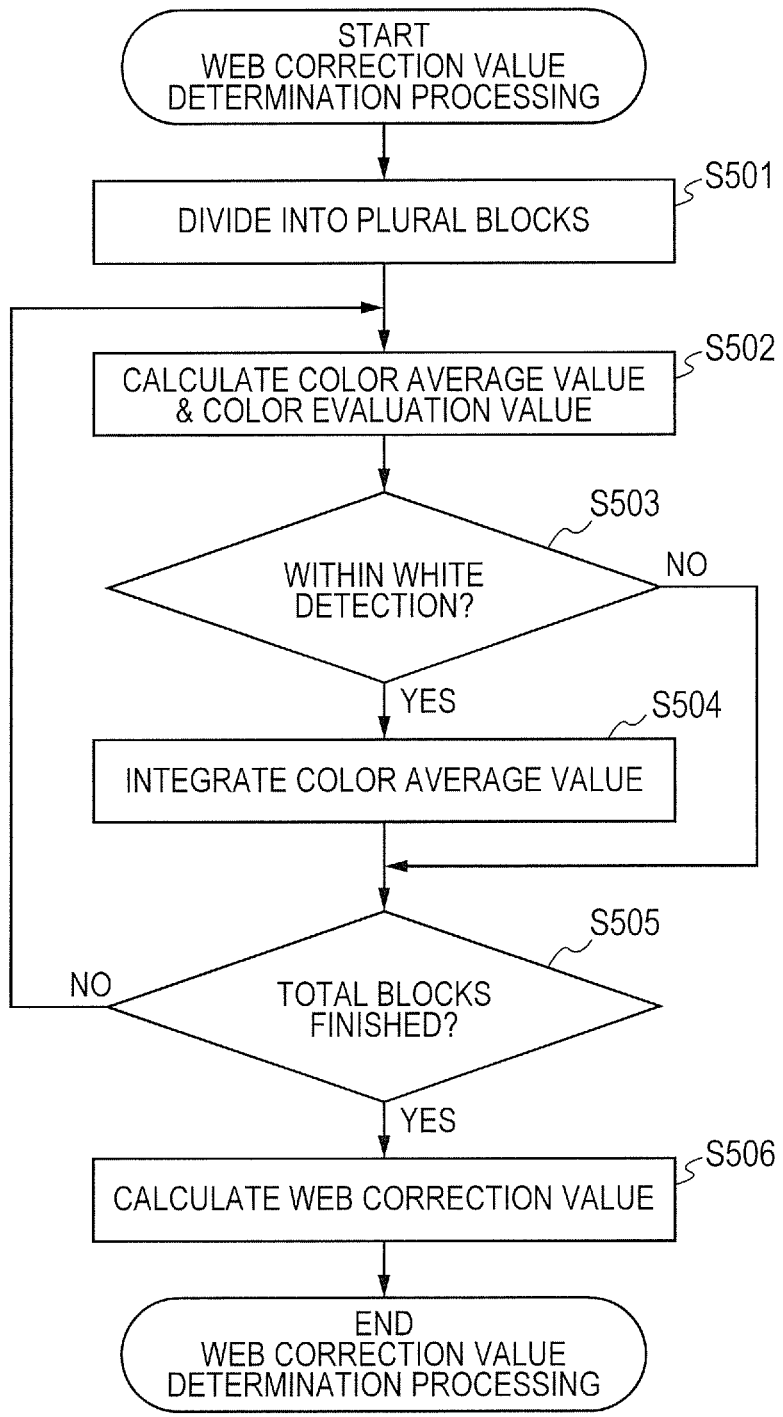
FIG. 5 is a flowchart of white balance correction value determination processing.
Figure 6A:
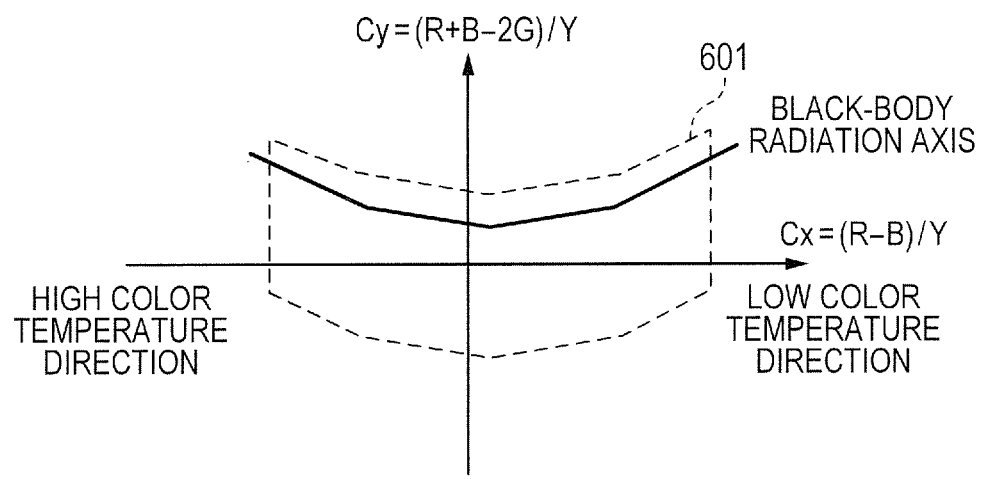
FIGS. 6A and 6B are characteristic diagrams each illustrating an example relation of a color evaluation value for performing white detection.
Figure 6B:
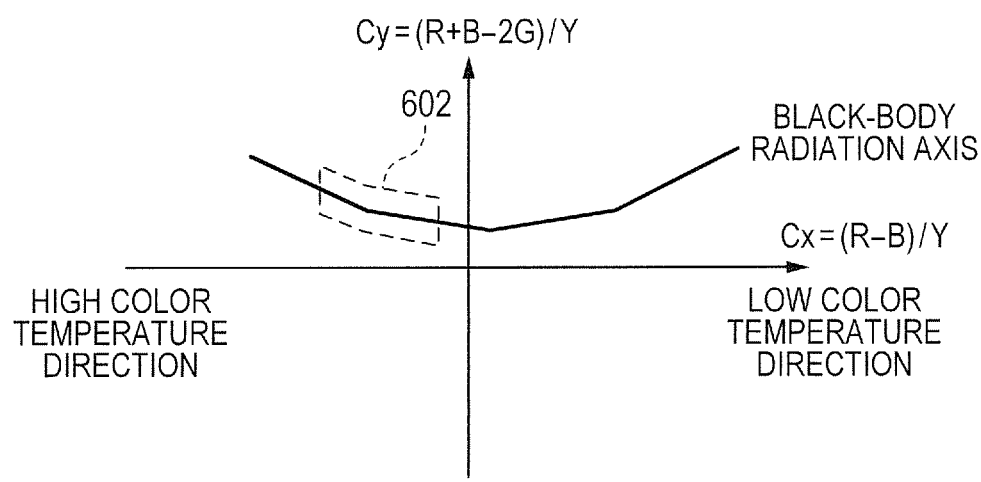

First, in Step S401, the first WEB correction value determining unit 206 determines first WEB correction values corresponding to environmental light, based on the image data 202 at photographing without strobe light-emitting. The WEB correction value determination processing at photographing without strobe light-emitting in Step S401 is described in detail with reference to FIG. 5, FIGS. 6A and 6B. FIG. 5 is a flowchart of the WEB correction value determination processing. FIGS. 6A and 6B are characteristic diagrams each illustrating a relation of a color evaluation value for performing white detection, FIG. 6A illustrates a white detection range at photographing without strobe light-emitting, and FIG. 6B illustrates a white detection range at photographing with strobe light-emitting.

In Step S501 in the flowchart of FIG. 5, the first WEB correction value determining unit 206 divides an image of the received image data 202 at photographing without strobe light-emitting into an arbitrary number n (1 to n) of blocks. In the present embodiment, the block division number "n" for the image data 202 at photographing without strobe light-emitting is made equal to a block division number "m" (to be described later) for the image data 205 at photographing with strobe light-emitting. After Step S501, the first WEB correction value determining unit 206 advances the processing to Step S502. In Step S502, the first WEB correction value determining unit 206 averages pixel values of each color for each block, and calculates respective color average values (R[i], G[i], B[i]) of RGB. Note that [i] represents an $i^{th}$ block of the (1 to n) blocks. Further, the first WEB correction value determining unit 206 calculates color evaluation values (Cx[i], Cy[i]) according to the following Expression (1).

$$Cx[i]=(R[i]-B[i])/Y[i]\times 1024$$

$$Cy[i]=(R[i]+B[i]-2G[i])/Y[i]\times 1024 \qquad \text{Expression (1)}$$

where Y[i]=(R[i]+2G[i]+B[i])/4

After Step S502, the first WEB correction value determining unit 206 advances the processing to Step S503. In Step S503, the first WEB correction value determining unit 206 performs white detection using graphs having coordinate axes as illustrated in FIGS. 6A and 6B. In FIGS. 6A and 6B, the negative direction of the x-coordinate (Cx) represents a color evaluation value when the color of a high color temperature object is photographed, and the positive direction thereof represents a color evaluation value when the color of a low color temperature object is photographed. Moreover, the y-coordinate (Cy) represents the degree of a green component of a light source, and the G component becomes larger toward the negative direction of the y-coordinate (Cy), that is, a higher degree of the G component indicates that the light source is a fluorescent light.

Moreover, in Step S503, the first WEB correction value determining unit 206 determines whether or not the color evaluation values (Cx[i], Cy[i]) of the $i^{th}$ block calculated in Step S502 are included in a preset white detection range 601 illustrated in FIG. 6A. Because the environmental light is an unknown light source, the white detection range 601 is defined with reference to color evaluation values that are calculated in advance from images obtained by photographing a white object under different light sources. Then, if it is determined in Step S503 that the color evaluation values (Cx[i], Cy[i]) of the $i^{th}$ block are included in the preset white detection range 601, the first WEB correction value determining unit 206 advances the processing to Step S504. On the other hand, if it is determined in Step S503 that the color evaluation values (Cx[i], Cy[i]) of the $i^{th}$ block are not included in the preset white detection range 601, the first WEB correction value determining unit 206 advances the processing to Step S505.

In Step S504, the first WEB correction value determining unit 206 determines that the $i^{th}$ block is white, integrates the color average values (R[i], G[i], B[i]) of this block, and obtains respective integral values (SumR, SumG, SumB) of the color average values. Note that the processing of Steps S503 and S504 can be represented by the following Expression (2).

$$SumR = \sum_{i=1}^{n} Sw[i] \times R[i]$$

$$SumG = \sum_{i=1}^{n} Sw[i] \times G[i]$$

$$SumB = \sum_{i=1}^{n} Sw[i] \times B[i] \qquad \text{Expression (2)}$$

Here, in Expression (2), if the color evaluation values (Cx[i], Cy[i]) are included in the white detection range 601, the first WEB correction value determining unit 206 sets "1" to Sw[i] in Expression (2). On the other hand, if the color evaluation values (Cx[i], Cy[i]) are not included in the white detection range 601, the first WEB correction value determining unit 206 sets "0" to Sw[i] in Expression (2). That is, if "1" is set to Sw[i], the first WEB correction value determining unit 206 integrates the color average values (R[i], G[i], B[i]). On the other hand, if "0" is set to Sw[i], the first WEB correction value determining unit 206 does not integrate the color average values (R[i], G[i], B[i]). After Step S504, the first WEB correction value determining unit 206 advances the processing to Step S505.

In Step S505, the first WEB correction value determining unit 206 determines whether or not the processing of Steps S502 to S504 has been performed on the total blocks. If it is determined in Step S505 that an unprocessed block exists, the first WEB correction value determining unit 206 returns the processing to Step S502, and repeats processing similar to the above. On the other hand, if it is determined in Step S505 that the processing of Steps S502 to S504 has been performed on the total blocks, the first WEB correction value determining unit 206 advances the processing to Step S506.

In Step S506, the first WEB correction value determining unit 206 calculates first WEB correction values (WEBCol_R1, WEBCol_G1, WEBCol_B1) according to Expression (3), from respective integral values (SumR1, SumG1, SumB1) of the color average values obtained for the total blocks. Note that the integral values (SumR1, SumG1, SumB1) are values obtained by integrating, for the total blocks, the respective integral values (SumR, SumG, SumB) of the color average values of each block.

$$WEBCol\_R1 = SumY1 \times 1{,}024/SumR1$$

$$WEBCol\_G1 = SumY1 \times 1{,}024/SumG1$$

$$WEBCol\_B1 = SumY1 \times 1{,}024/SumB1 \qquad \text{Expression (3)}$$

where SumY1=(SumR1+2×SumG1+SumB1)/4

Note that, although the example in which the first WEB correction values are calculated from the image data 202 at photographing without strobe light-emitting is described here, in the case where the environmental light is known (for example, photographing in a studio), the first WEB correction values may be set in advance.

Returning to the description of FIG. 4, after Step S401, the processing advances to Step S402, and the processing of Step S402 is performed by the second WEB correction value determining unit 208. In Step S402, the second WEB correction value determining unit 208 determines second WEB correction values corresponding to strobe light, based on the image data 205 at photographing with strobe light-emitting. The processing of determining the second WEB correction values is performed according to a method similar to the above-mentioned processing of determining the first WEB correction values. Note that, unlike the processing of determining the first WEB correction values, the processing of determining the second WEB correction values is performed using a white detection range 602 for the strobe light as illustrated in FIG. 6B. This is because the environmental light is basically an unknown light source whereas the strobe light is a known light source and because the range of the strobe light can be limited as indicated by the white detection range 602 in FIG. 6B. Note that WEB correction values corresponding to the strobe light as the second WEB correction values may be preset as known values.

After Step S402, the processing advances to Step S403, and the processing of Step S403 is performed by the strobe light component calculating unit 210. In Step S403, the strobe light component calculating unit 210 calculates a strobe light component of each block of the image data 205 at photographing with strobe light-emitting, from the data on the distribution characteristics 203 of the strobe light and the data on the distance map 204 acquired with strobe light-emitting.

Figure 7:
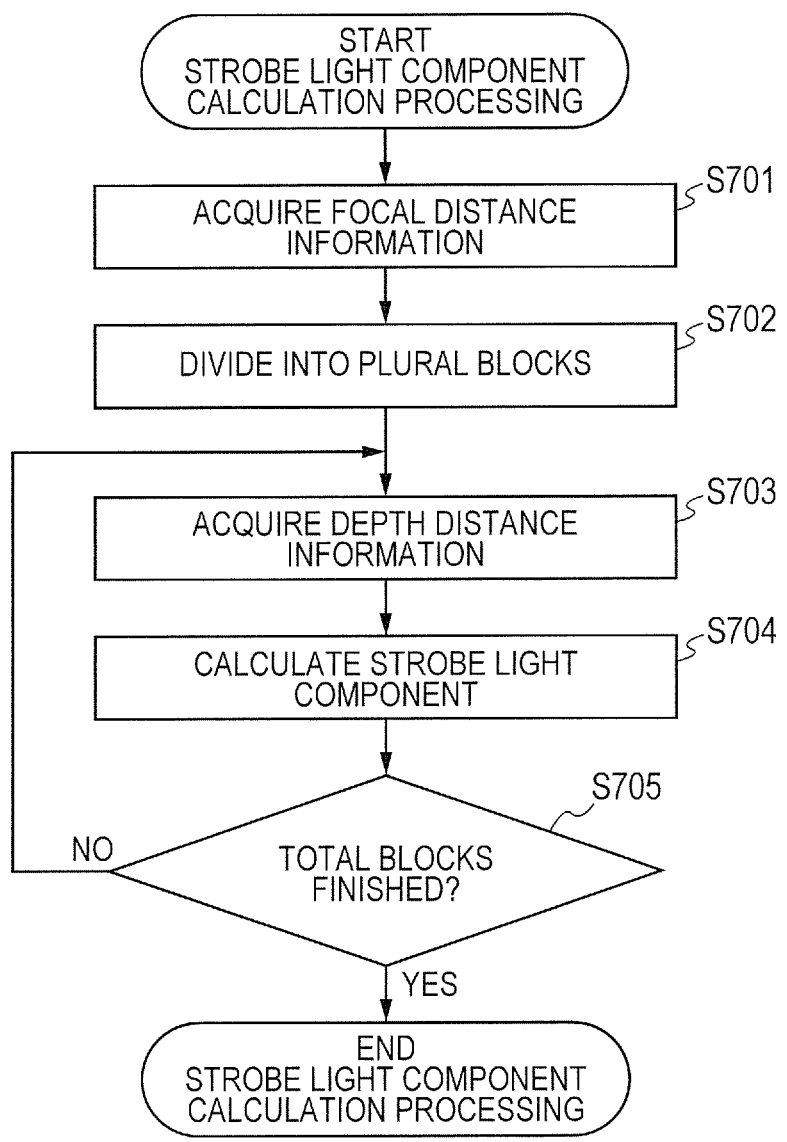
FIG. 7 is a flowchart of strobe light component calculation processing in a first embodiment.
Figure 8A:
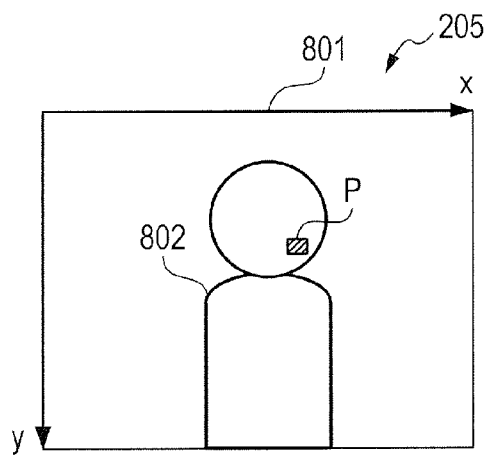
FIGS. 8A, 8B and 8C are diagrams for describing the strobe light component calculation processing.
Figure 8B:
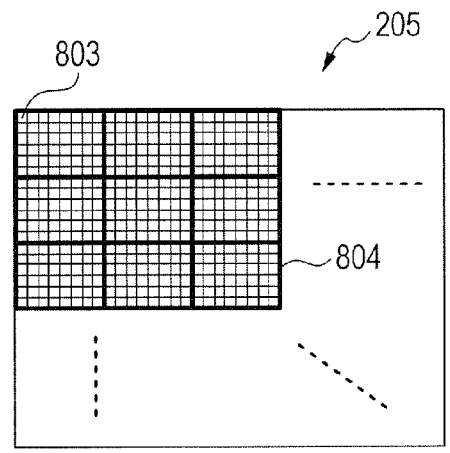
Figure 8C:
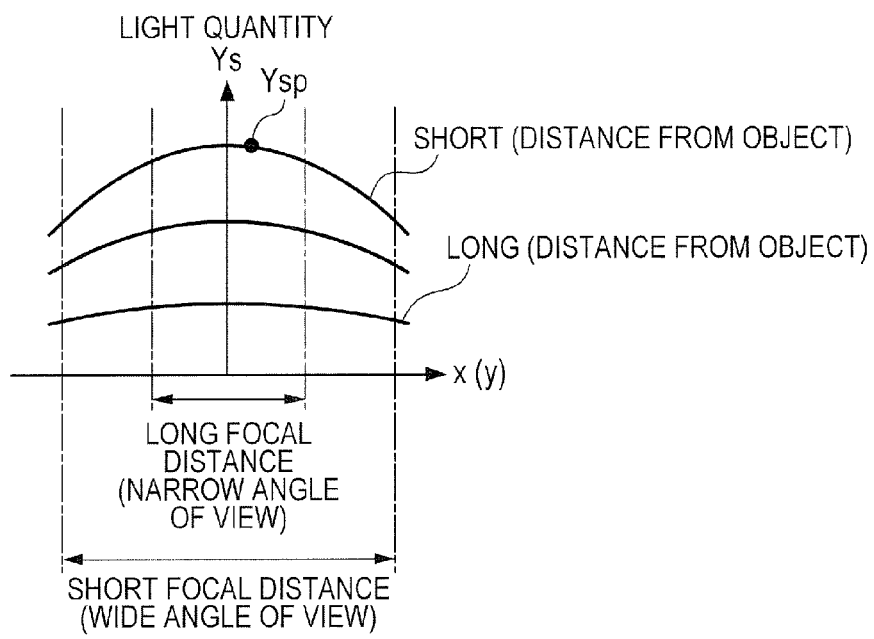

Here, the strobe light component calculation processing of Step S403 is described in detail with reference to FIG. 7 and FIGS. 8A to 8C. FIG. 7 is a flowchart of the strobe light component calculation processing. FIG. 8A is a diagram illustrating an image 801 (image data 205) at photographing with strobe light-emitting and an example block (block P) whose strobe light component is to be calculated. FIG. 8B is a diagram illustrating an example division into blocks that are processing units in the strobe light component calculation processing. FIG. 8C is a diagram illustrating an example of the distribution characteristics of the strobe light.

First, in the flowchart of FIG. 7, as the processing of Step S701, the strobe light component calculating unit 210 acquires lens focal distance information at photographing with strobe light-emitting from the system controlling unit 106. That is, because the system controlling unit 106 performs autofocus control for driving the focus lens in the imaging optical system 101 and thus holds the focal distance information, the strobe light component calculating unit 210 acquires the focal distance information therefrom. After Step S701, the strobe light component calculating unit 210 advances the processing to Step S702.

In Step S702, the strobe light component calculating unit 210 divides the image data 205 at photographing with strobe light-emitting into a number m of blocks, the number m being equal to the block division number adopted at creating the distance map 204. This makes the resolution of the distance map 204 equal to the resolution of each block obtained by dividing the image data 205 at photographing with strobe light-emitting. FIG. 8B is a diagram schematically illustrating a state where the image data 205 at photographing with strobe light-emitting including plural pixels 803 is divided for each block of a range 804 indicated by thick lines in FIG. 8B, the range 804 corresponding to each block of the distance map 204. Note that, in the image data 205 at photographing with strobe light-emitting like the image 801 in FIG. 8A, for example, the block P that is part of an image of an object 802 indicates one of the blocks divided as described above. After Step S702, the strobe light component calculating unit 210 advances the processing to Step S703.

In Step S703, the strobe light component calculating unit 210 reads distance information (distance information in the depth direction from the strobe light source) on the distance map 204 corresponding to each block divided in Step S702 out of the memory unit 110. After Step S703, the strobe light component calculating unit 210 advances the processing to Step S704.

In Step S704, the strobe light component calculating unit 210 calculates a strobe light component. Specifically, the strobe light component calculating unit 210 calculates a strobe light component from the coordinates of a block corresponding to (x, y) coordinates of the distance map 204, the focal distance information acquired in Step S701, the depth distance information on the distance map 204 acquired in Step S703 and the distribution characteristics 203 of the strobe light.

Here, the distribution characteristics 203 of the strobe light are characteristics (as illustrated in FIG. 8C) indicating how a light quantity Ys that reaches the object changes depending on the distance and the direction from the strobe light source. Note that FIG. 8C is described assuming the case of photographing in the state where the strobe light is emitted toward the object without changing the radiation direction of the strobe light and the case of photographing in the state where the emitted light quantity of the strobe light source and the spreading angle of the strobe light are not changed and kept constant. As is apparent from FIG. 8C, the light quantity Ys of the strobe light that reaches the object becomes larger as the distance from the strobe light source to the object becomes shorter, and, conversely, becomes smaller as the distance therefrom to the object becomes longer. Moreover, the direction from the strobe light source can be expressed by an angle formed by: the optical axis of one of a lens optical system and a reflective optical system included in the strobe light source (referred to as the optical axis of the strobe light source); and a line segment connecting from a light emitting point of the strobe light source to the object (referred to as the line segment from the light source to the object). As the angle formed by the optical axis of the strobe light source and the line segment from the light source to the object becomes smaller (the position of the object becomes closer to the optical axis of the strobe light source), the light quantity Ys that reaches the object becomes larger. Conversely, as the angle formed by the optical axis of the strobe light source and the line segment from the light source to the object becomes larger (the position of the object becomes farther from the optical axis of the strobe light source), the light quantity Ys that reaches the object becomes smaller. Moreover, the focal distance at photographing corresponds to the angle of view at photographing. As the focal distance becomes longer (larger), the angle of view becomes narrower. Conversely, as the focal distance becomes shorter (smaller), the angle of view becomes wider. That is, as the focal distance becomes longer (the angle of view becomes narrower), the proportion of an image of the object to a photographed image becomes larger. Conversely, as the focal distance becomes shorter (the angle of view becomes wider), the proportion of the image of the object to the photographed image becomes smaller. Moreover, if the focal distance is long (the angle of view is narrow), a photographed image is obtained in a narrow range with respect to the spreading angle of the strobe light. Conversely, if the focal distance is short (the angle of view is wide), the photographed image is obtained in a wide range with respect to the spreading angle of the strobe light. Further, in the present embodiment, the size of the distance map corresponds to the size of a sensor surface of the imaging device 102, and the resolution of the distance map is equal to the resolution based on the above-mentioned block division number. Accordingly, if the focal distance changes, (x, y) coordinates of the object image with respect to (x, y) coordinates of the distance map also change, and the direction of the object with respect to the optical axis of the strobe light source also changes. As an example, even if the strobe light component of the block P illustrated in FIG. 8A is Ysp in FIG. 8C at a given focal distance, if the focal distance changes, the direction of the block P with respect to the optical axis of the strobe light source also changes, and the strobe light component becomes different. Note that, although FIG. 8C illustrates the case where distribution characteristics in the x-axis direction are the same as distribution characteristics in the y-axis direction, the distribution characteristics in the x-axis direction may be different from the distribution characteristics in the y-axis direction depending on the shape of the strobe.

Then, the strobe light component calculating unit 210 calculates a strobe light component Ys[i] of each of the (1 to m) divided blocks according to a function g in Expression (4) using the following four arguments. In Expression (4), the four arguments are coordinates (x[i], y[i]) of the distance map corresponding to each block, depth distance information z(x[i], y[i]) on the distance map and a focal distance f. That is, the strobe light component calculating unit 210 calculates the object position in the real space based on these four arguments, and obtains the strobe light component Ys[i] by applying information on the distribution characteristics.

$$Ys[i]=g(x[i],y[i],z(x[i],y[i]),f) \qquad \text{Expression (4)}$$

Note that, although the example in which the above four arguments are used to calculate the strobe light component is described here, other arguments concerning the strobe light component may be used. Meanwhile, although the calculation accuracy of the strobe light component is lower, only the depth distance information may be used as an argument on the assumption that every object is located in front of the light source. Moreover, although the example in which the strobe light component is calculated according to the function using the plural arguments is described here, the strobe light component may be held as a table, and may be determined by referring to the table according to conditions. After Step S704, the strobe light component calculating unit 210 advances the processing to Step S705.

In Step S705, the strobe light component calculating unit 210 determines whether or not the processing of Steps S703 and S704 has been performed on the total blocks. If it is determined in Step S705 that an unprocessed block exists, the strobe light component calculating unit 210 returns the processing to Step S703, and repeats processing similar to the above. On the other hand, if it is determined in Step S705 that the processing of Steps S703 and S704 has been performed on the total blocks, the strobe light component calculating unit 210 ends the strobe light component calculation processing illustrated in the flowchart of FIG. 7.

If the strobe light component calculation processing in the flowchart of FIG. 7 is ended, the processing by the image processing unit 104 advances to image combining ratio calculation processing of Step S404 in FIG. 4, and the processing of Step S404 is performed by the combining ratio calculating unit 211. In the processing of Step S404, the combining ratio calculating unit 211 calculates a combining ratio $\alpha$ used for image combining. Here, the combining ratio calculating unit 211 calculates the combining ratio $\alpha$ using the strobe light component Ys[i] of each block calculated in Step S403 and the image data 205 at photographing with strobe light-emitting. First, the combining ratio calculating unit 211 divides the image data 205 at photographing with strobe light-emitting into the number m of blocks similarly to the strobe light component calculation processing, averages pixel values of each color of RGB for each block, and calculates color average values (Rt[i], Gt[i], Bt[i]). Then, the combining ratio calculating unit 211 calculates a luminance value Yt[i] of each block according to the following Expression (5).

$$Yt[i]=0.3\times Rt[i]+0.6\times Gt[i]+0.1\times Bt[i] \qquad \text{Expression (5)}$$

Here, the luminance value Yt[i] of each block thus calculated is defined as the sum of the strobe light component and the environmental light component of each block. The combining ratio calculating unit 211 further calculates the ratio of the strobe light component Ys[i] in Expression (4) to the sum Yt[i] of the strobe light component and the environmental light component according to the following Expression (6), to thereby obtain a combining ratio $\alpha$[i] of each block.

$$\alpha[i]=Ys[i]/Yt[i] \qquad \text{Expression (6)}$$

Subsequently, if the combining ratio calculation processing of Step S404 is ended, the processing by the image processing unit 104 advances to corrected image data generating processing of Step S405, and the processing of Step S405 is performed by the first correcting unit 207 and the second correcting unit 209. In the processing of Step S405, the first correcting unit 207 generates first corrected image data Yuv1 from the image data 205 at photographing with strobe light-emitting, using the first WEB correction values corresponding to the environmental light determined in Step S401. Moreover, in Step S405, the second correcting unit 209 generates second corrected image data Yuv2 from the image data 205 at photographing with strobe light-emitting, using the second WEB correction values corresponding to the strobe light determined in Step S402. Note that the first correcting unit 207 and the second correcting unit 209 also perform development processing from RGB to YUV.

Subsequently, if the corrected image data generating processing of Step S405 is ended, the processing by the image processing unit 104 advances to image combining processing of Step S406, and the processing of Step S406 is performed by the combining unit 212. In Step S406, the combining unit 212 combines the corrected image data Yuv1 and the corrected image data Yuv2 using the combining ratio $\alpha$[i] of each block calculated in Step S404, and generates combined image data Yuv3. Specifically, the combining unit 212 calculates color evaluation values (Y3[$i$], u3[$i$], v3[$i$]) of the combined image data Yuv3 according to the following Expression (7). (Y1[$i$], u1[$i$], v1[$i$]) in Expression (7) are color evaluation values of the corrected image data Yuv1, and (Y2[$i$], u2[$i$], v2[$i$]) in Expression (7) are color evaluation values of the corrected image data Yuv2.

$$Y3[i]=Y1[i]\times(1-\alpha[i])+Y2[i]\times\alpha[i]$$

$$u3[i]=u1[i]\times(1-\alpha[i])+u2[i]\times\alpha[i]$$

$$v3[i]=v1[i]\times(1-\alpha[i])+v2[i]\times\alpha[i] \qquad \text{Expression (7)}$$

Here, in order to reduce a coloring discrepancy that occurs in a boundary portion between blocks, the combining ratio calculating unit 211 may further perform pixel interpolation processing in Step S404, to thereby calculate a combining ratio $\beta$[j] of each pixel from the combining ratio $\alpha$[i] of each block. Note that [j] represents a $j^{th}$ pixel of the pixels in each block. Specifically, the combining ratio calculating unit 211 calculates the combining ratio $\beta$[j] of each pixel from the combining ratio α[i] of each block, using bilinear interpolation as the pixel interpolation processing. Moreover in this case, in Step S406, the combining unit 212 combines the corrected image data Yuv1 and the corrected image data Yuv2 using the combining ratio β[j] of each pixel, and generates the combined image data Yuv3. Color evaluation values (Y3[j], u3[j], v3[j]) of the combined image data Yuv3 are calculated from color evaluation values (Y1[j], u1[j], v1[j]) of the corrected image data Yuv1 and color evaluation values (Y2[j], u2[j], v2[j]) of the corrected image data Yuv2. That is, the combining unit 212 calculates the color evaluation values (Y3[j], u3[j], v3[j]) of the combined image data Yuv3 according to the following Expression (8).

$$Y3[j]=Y1[j]\times(1-\beta[j])+Y2[j]\times\beta[j]$$

$$u3[j]=u1[j]\times(1-\beta[j])+u2[j]\times\beta[j]$$

$$v3[j]=v1[j]\times(1-\beta[j])+v2[j]\times\beta[j] \quad \text{Expression (8)}$$

As has been described above, the image processing unit 104 of the present embodiment calculates the strobe light component from the distance map and the distribution characteristics of the strobe light. Consequently, according to the present embodiment, for example, even if one of the object and the imaging apparatus moves at photographing, a coloring discrepancy in a boundary portion of the object can be reduced, and appropriate coloring can be given to both the main object and the background. Note that, although FIG. 2 illustrates the configuration example in which the image processing unit 104 includes the first and second WEB correction value determining units 206 and 208 and the first and second correcting units 207 and 209, the present invention is not limited thereto, and the image processing unit 104 may include one WEB correction value determining unit and one correcting unit. In the case of using one WEB correction value determining unit and one correcting unit, the following time-division sequential processing is performed. That is, processing similar to the processing by the first WEB correction value determining unit 206 and the first correcting unit 207 is first performed, and processing similar to the processing by the second WEB correction value determining unit 208 and the second correcting unit 209 is then performed. Moreover, although the example in which image data is divided into plural blocks and processing is performed on a block basis is described in the present embodiment, the present invention is not limited thereto, and processing may be performed on a pixel basis considering the processing time and the image quality.

Second Embodiment

Next, an image processing apparatus of the second embodiment is described. In the image processing apparatus of the second embodiment, a reflectance of the object is further applied to the processing by the strobe light component calculating unit 210 described in the first embodiment. Hereinafter, in the image processing apparatus of the second embodiment, only processing different from the processing in the first embodiment is described, and description of the same processing as the processing in the first embodiment is omitted.

In the image processing apparatus of the second embodiment, as the processing of Step S704 in the flowchart of FIG. 7, the strobe light component calculating unit 210 calculates the strobe light component Ys[i] of each block according to the following Expression (9) obtained by applying a reflectance r of the object to Expression (4). Note that the reflectance r of the object is defined as a standard reflectance that is an average value of a general substance stored in advance in the memory unit 110.

$$Ys[i]=g(x[i],y[i],z(x[i],y[i]),f)\times r \quad \text{Expression (9)}$$

Figure 9A:
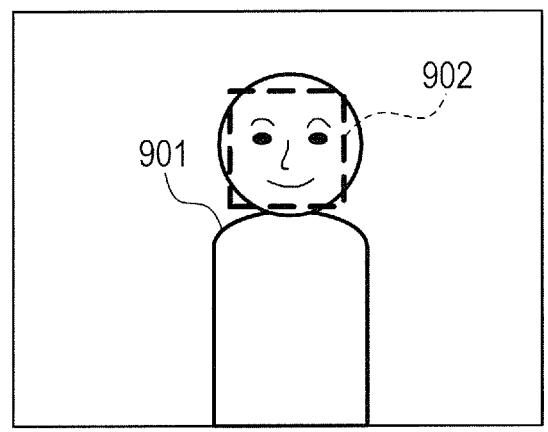
FIGS. 9A and 9B are diagrams for describing face detection processing.

Moreover, in the second embodiment, the strobe light component calculating unit 210 can calculate the strobe light component considering, for example, a reflectance of a human face instead of the standard reflectance. FIG. 9A is a schematic diagram illustrating an example case where a face is detected from a photographed image. The face detecting unit 112 included in the image processing unit 104 detects a human image region 901 that is the object, from image data at photographing with strobe light-emitting, and further detects a face image to identify a face image region 902. With regard to blocks corresponding to the face image region 902 detected by the face detecting unit 112, the strobe light component calculating unit 210 of the WEB correcting unit 105 calculates the strobe light component Ys[i] using the reflectance of the human face stored in advance in the memory unit 110.

As has been described above, according to the second embodiment, the reflectance of the object is considered at calculating the strobe light component. Hence, the calculation accuracy of the strobe light component can be enhanced, and more appropriate white balance correction is possible. Moreover, the image processing apparatus of the second embodiment detects the human face image region from the photographed image, and calculates the strobe light component considering the reflectance of the human face with regard to the face image region. Hence, more appropriate WEB correction is possible for, particularly, the human face.

Third Embodiment

Next, an image processing apparatus of the third embodiment is described. In the image processing apparatus of the third embodiment, a reflection direction of the strobe light on the object surface is further applied to the processing by the strobe light component calculating unit 210 described in the second embodiment. Hereinafter, in the image processing apparatus of the third embodiment, only processing different from the processing in the second embodiment is described, and description of the same processing as the processing in the second embodiment is omitted.

Figure 10:
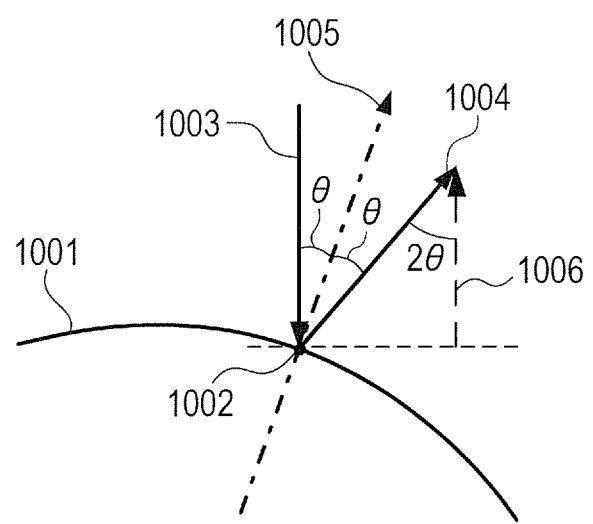
FIG. 10 is a diagram illustrating a relation between a direction normal to an object surface and reflected light of strobe light.

FIG. 10 is a diagram illustrating a relation between a direction normal to the object surface and reflected light of the strobe light. First, a method of calculating a reflection angle θ of the strobe light to the object surface is described. As illustrated in FIG. 10, in the case where strobe light 1003 enters a point 1002 on an object surface 1001, the strobe light is reflected on the point 1002 on the object surface 1001 to become reflected light 1004. The reflection angle θ of the reflected light 1004 to the object surface 1001 can be calculated by estimating a normal vector 1005 at the point 1002 from the surface shape of the object and obtaining an angle formed by the strobe light and the normal. Accordingly, a reflected light component of the strobe light that can be actually observed from the imaging apparatus, of a reflected light component of the reflected light 1004 is such a reflected light component 1006 as illustrated in FIG. 10. For simplification of description, FIG. 10 illustrates the entrance and the reflection of the strobe light 1003 on the object surface 1001 in the form of a two-dimensional plane including the strobe light 1003, the reflected light 1004 and the normal, but, originally, the entrance and the reflection of the strobe light 1003 are phenomena in a three-dimensional space. Accordingly, the normal vector 1005 and the reflected light component 1006 are actually obtained so as to suit the three-dimensional space.

Here, the surface shape of the object can be calculated by performing interpolation processing on the distance map. That is, in Step S704 in the flowchart of FIG. 7, the strobe light component calculating unit 210 calculates the strobe light component Ys[i] of each block according to the following Expression (10) obtained by applying the reflection angle θ of the strobe light to Expression (9).

$$Ys[i]=g(x[i],y[i],z(x[i],y[i]),f)\times \cos 2\theta \times r \quad \text{Expression (10)}$$

Figure 9B:
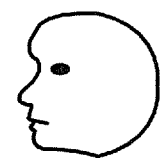

Moreover, in the third embodiment, if the face detecting unit 112 included in the image processing unit 104 detects a face image from image data at photographing with strobe light-emitting, the face detecting unit 112 further detects the positions of organs such as eyes and a mouth from the face image region. In this case, the strobe light component calculating unit 210 applies such a three-dimensional face model as illustrated in FIG. 9B, based on information on the positions of the organs such as eyes and a mouth detected by the face detecting unit 112, to thereby calculate a normal vector. Note that data on the three-dimensional face model is stored in advance in the memory unit 110. Then, the strobe light component calculating unit 210 defines the normal vector as a reflected light component.

As has been described above, according to the third embodiment, the reflection direction of the strobe light on the object surface is considered at calculating the strobe light component. Hence, the calculation accuracy of the strobe light component can be enhanced, and more appropriate white balance correction is possible. Moreover, the image processing apparatus of the third embodiment calculates the strobe light component considering the reflection direction of the strobe light on the human face, based on the human face image region detected from the photographed image. Hence, more appropriate WEB correction is possible for, particularly, the human face.

Fourth Embodiment

Next, an image processing apparatus of the fourth embodiment is described. The image processing apparatus of the fourth embodiment detects movements of the object and the imaging apparatus and switches strobe light component calculating methods according to the movement detection result, at the time of the processing by the strobe light component calculating unit 210 described in the first embodiment.

Figure 11:
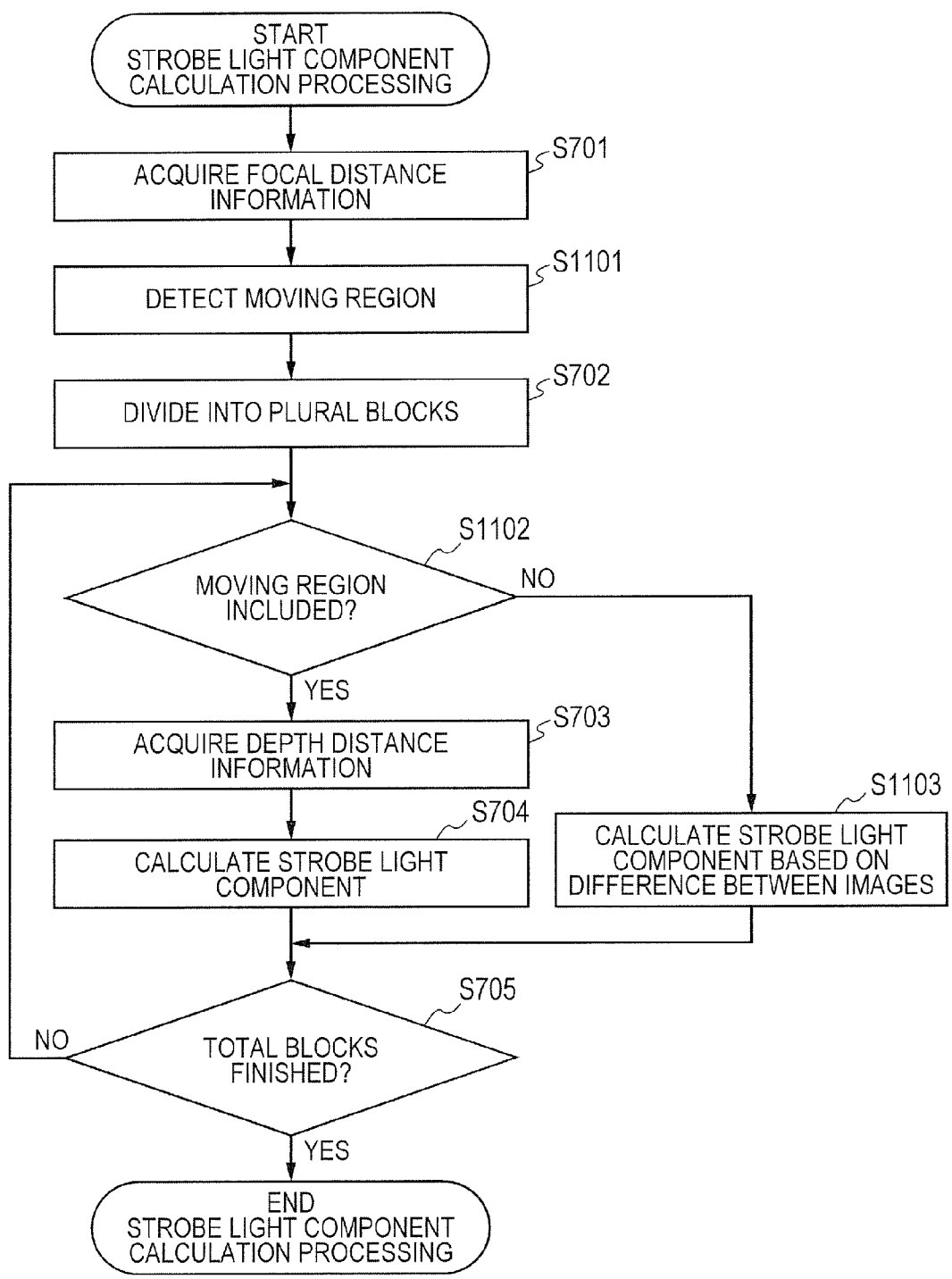
FIG. 11 is a flowchart of strobe light component calculation processing of a fourth embodiment.
Figure 12A:
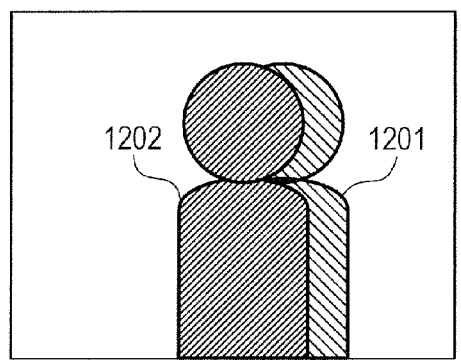
FIGS. 12A and 12B are diagrams for describing moving region detection processing.
Figure 12B:
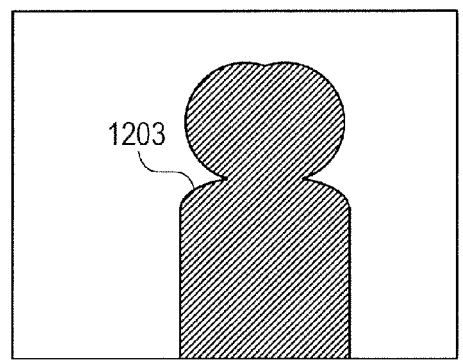

Hereinafter, the image processing apparatus of the fourth embodiment is described with reference to FIG. 11, FIGS. 12A and 12B. FIG. 11 is a flowchart of processing by the strobe light component calculating unit 210 in the fourth embodiment. Note that, in the flowchart of FIG. 11, the same processing as the processing in the flowchart of FIG. 7 used to describe the first embodiment is denoted by the same reference sign as the reference sign in FIG. 7, and description thereof is omitted as appropriate. Moreover, FIGS. 12A and 12B are schematic diagrams for describing moving region detection processing of detecting movements of the object and the imaging apparatus from a photographed image.

In the flowchart of FIG. 11, upon completion of the acquisition of the focal distance information in Step S701, the strobe light component calculating unit 210 advances the processing to Step S1101. In Step S1101, as illustrated in FIG. 12A, the strobe light component calculating unit 210 identifies an object region 1201 at photographing without strobe light-emitting and an object region 1202 at photographing with strobe light-emitting. Then, the strobe light component calculating unit 210 detects such a moving region 1203 as illustrated in FIG. 12B from the object region 1201 at photographing without strobe light-emitting and the object region 1202 at photographing with strobe light-emitting. At this time, the moving region 1203 is detected by, for example, comparing the image data 202 at photographing without strobe light-emitting and the image data 205 at photographing with strobe light-emitting and determining whether or not a difference between the image data 202 and the image data 205 is equal to or more than a predetermined amount. Note that, at this time, the strobe light component calculating unit 210 compares these pieces of image data after subtracting the strobe light component from the image data 205 at photographing with strobe light-emitting, considering influences by the strobe light. Then, the strobe light component calculating unit 210 detects, as the moving region 1203, a region in which the difference between the image data 202 and the image data 205 is equal to or more than the predetermined amount. Upon completion of the detection of the moving region in Step S1101, the strobe light component calculating unit 210 advances the processing to Step S702.

In Step S702, the strobe light component calculating unit 210 divides both the image data 205 at photographing with strobe light-emitting and the image data 202 at photographing without strobe light-emitting into plural blocks, in a manner similar to the manner in the first embodiment. Upon completion of the division of the pieces of image data in Step S702, the strobe light component calculating unit 210 advances the processing to Step S1102.

In Step S1102, the strobe light component calculating unit 210 determines whether or not the moving region detected in Step S1101 is included in the processing target block. If the moving region is included in the processing target block, the strobe light component calculating unit 210 advances the processing to Step S703. Then, the strobe light component calculating unit 210 performs the processing from Step S703 to Step S705 described in the first embodiment. On the other hand, if it is determined in Step S1102 that the moving region is not included in the processing target block, the strobe light component calculating unit 210 advances the processing to Step S1103.

In Step S1103, the strobe light component calculating unit 210 calculates the strobe light component from the difference between the image data 202 at photographing without strobe light-emitting and the image data 205 at photographing with strobe light-emitting. Specifically, the strobe light component calculating unit 210 first calculates the strobe light component Ys[i] from a luminance value Ye[i] of each block of the image data 202 at photographing without strobe light-emitting and the luminance value Yt[i] of each block of the image data 205 at photographing with strobe light-emitting. A method of calculating the luminance value Ye[i] and the luminance value Yt[i] is as described in Step S404 of FIG. 4 in the first embodiment. Subsequently, the strobe light component calculating unit 210 calculates the strobe light component Ys[i] by subtracting the environmental light component (Ye[i]) from the sum (Yt[i]) of the strobe light component and the environmental light component according to the following Expression (11).

$$Ys[i]=Yt[i]-Ye[i] \quad \text{Expression (11)}$$

Upon completion of the calculation of the strobe light component Ys[i] in Step S1103, the strobe light component calculating unit 210 advances the processing to Step S705. Then, in Step S705, the strobe light component calculating unit 210 determines whether or not the processing on the total blocks has been completed. If it is determined in Step S705 that the processing on the total blocks has been completed, the strobe light component calculating unit 210 ends the strobe light component calculation processing. On the other hand, if it is determined in Step S705 that the processing on the total blocks has not been completed (an unprocessed block remains), the strobe light component calculating unit 210 returns the processing to Step S1102, and performs the above-mentioned processing.

As has been described above, in the fourth embodiment, strobe light component calculating methods are switched according to the detection result of the moving region. Hence, the calculation accuracy of the strobe light component of the background region for which the accuracy of the distance map is lower can be enhanced. Consequently, according to the fourth embodiment, even in the case of photographing with strobe light-emitting in the state where the object and the imaging apparatus are moving, a coloring discrepancy in a boundary portion of the object can be reduced, and appropriate coloring can be given to both the main object and the background. In this way, according to the fourth embodiment, the calculation accuracy of the strobe light component of a long-distance region, that is, the background region for which the accuracy of the distance map is lower can be enhanced, and more appropriate white balance correction is possible.

Note that, although the example in which the moving region is detected from the difference between the image data at photographing without strobe light-emitting and the image data at photographing with strobe light-emitting is described in the fourth embodiment, the present invention is not limited thereto. For example, the moving region may be detected from a difference between a distance map at photographing without strobe light-emitting and a distance map at photographing with strobe light-emitting. That is, if the difference between the distance map at photographing without strobe light-emitting and the distance map at photographing with strobe light-emitting is, for example, more than a predetermined value, it can be detected that the object has moved.

Hereinabove, exemplary embodiments of the present invention have been described. The present invention is not limited to these embodiments, and can be variously modified and changed within the range of the gist thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-018688, filed Feb. 2, 2015, which is hereby incorporated by reference herein in its entirety.

What is claimed is:

1. An image processing apparatus comprising:
one or more processors; and
a memory coupled to the one or more processors and having stored thereon instructions that, when executed by the one or more processors, cause the image processing apparatus to:
correct data on a strobe light-emission image photographed with strobe light-emitting, using a first white balance correction value corresponding to environmental light;
generate first white balance correction image data;
correct the data on the strobe light-emission image using a second white balance correction value corresponding to strobe light;
generate second white balance correction image data;
acquire distance information indicating a distance from an imaging unit, of each object included in the strobe light-emission image;
calculate a normal vector to a surface of a photographed object based on the distance information;
calculate a ratio of a component of the strobe light for each region of the strobe light-emission image, based on distribution characteristics of the strobe light, a reflectance of the photographed object, and the normal vector to the surface of the photographed object, wherein the distribution characteristics of the strobe light are characteristics indicating how a light quantity reaching the photographed object changes depending on a distance and a direction from a strobe light source; and
combine the first white balance correction image data and the second white balance correction image data for each region using a combining ratio according to the component ratio.

2. The image processing apparatus according to claim 1, wherein a combining ratio corresponding to each pixel of the strobe light-emission image is calculated through pixel interpolation, from the combining ratio calculated for each region of the strobe light-emission image.

3. The image processing apparatus according to claim 1, wherein the instructions, when executed by the one or more processors, further cause the image processing apparatus to detect a region of a face from the photographed image, wherein the strobe light component is calculated using a reflectance of the face as the reflectance of the photographed object, with regard to the detected region of the face.

4. An image processing apparatus comprising:
one or more processors; and
a memory coupled to the one or more processors and having stored thereon instructions that, when executed by the one or more processors, cause the image processing apparatus to:
   correct data on a strobe light-emission image photographed with strobe light-emitting, using a first white balance correction value corresponding to environmental light;
   generate first white balance correction image data;
   correct the data on the strobe light-emission image using a second white balance correction value corresponding to strobe light;
   generate second white balance correction image data;
   acquire distance information indicating a distance from an imaging unit, of each object included in the strobe light-emission image;
   calculate a ratio of a component of the strobe light for each region of the strobe light-emission image, based on distribution characteristics of the strobe light and the distance information, wherein the distribution characteristics of the strobe light are characteristics indicating how a light quantity reaching the object changes depending on a distance and a direction from a strobe light source; and
   combine the first white balance correction image data and the second white balance correction image data for each region using a combining ratio according to the component ratio,
wherein the instructions, when executed by the one or more processors, further cause the image processing apparatus to detect a moving region from the photographed image,
wherein the strobe light component is calculated based on the distance information and the distribution characteristics of the strobe light, with regard to a region detected as the moving region, and
wherein the strobe light component is calculated based on an image photographed without strobe light-emitting and the image photographed with strobe light-emitting, with regard to a region that is not detected as the moving region.

5. An imaging apparatus comprising:
a light emitting unit that emits strobe light;
an imaging unit that acquires a strobe light-emission image by photographing with strobe light-emitting;
one or more processors; and
a memory coupled to the one or more processors and having stored thereon instructions that, when executed by the one or more processors, cause the imaging apparatus to:
   correct data on the strobe light-emission image using a first white balance correction value corresponding to environmental light;
   generate first white balance correction image data;
   correct the data on the strobe light-emission image using a second white balance correction value corresponding to the strobe light;
   generate second white balance correction image data;
   acquire distance information indicating a distance from the imaging unit, of each object included in the strobe light-emission image;
   calculate a normal vector to a surface of a photographed object based on the distance information;
   calculate a component ratio of the strobe light for each region of the strobe light-emission image, based on distribution characteristics of the strobe light, a reflectance of the photographed object, and the normal vector to the surface of the photographed object, wherein the distribution characteristics of the strobe light are characteristics indicating how a light quantity reaching the photographed object changes depending on a distance and a direction from a strobe light source; and
   combine the first white balance correction image data and the second white balance correction image data for each region using a combining ratio according to the component ratio.

6. The imaging apparatus according to claim 5,
wherein the imaging unit includes plural microlenses arranged in a lattice-like pattern and plural divided pixels provided below each microlens, and
wherein the distance information is information obtained by calculating a correlation value based on pixel values of the divided pixels.

7. An image processing method comprising:
correcting data on a strobe light-emission image photographed with strobe light-emitting, using a first white balance correction value corresponding to environmental light, and generating first white balance correction image data;
correcting the data on the strobe light-emission image using a second white balance correction value corresponding to strobe light, and generating second white balance correction image data;
acquiring distance information indicating a distance from an imaging unit, of each object included in the strobe light-emission image;
calculating a normal vector to a surface of a photographed object based on the distance information;
calculating a ratio of a component of the strobe light for each region of the strobe light-emission image, based on distribution characteristics of the strobe light, a reflectance of the photographed object, and the normal vector to the surface of the photographed object, wherein the distribution characteristics of the strobe light are characteristics indicating how a light quantity reaching the photographed object changes depending on a distance and a direction from a strobe light source; and
combining the first white balance correction image data and the second white balance correction image data for each region using a combining ratio according to the component ratio.

* * * * *